Patented June 1, 1943

2,320,633

UNITED STATES PATENT OFFICE 2,320,633

WATER SEALING COMPOSITION FOR OIL WELLS

David L. Mitchell and Harry Marks, Los Angeles, and Harry C. Beene, Long Beach, Calif.

No Drawing. Application November 16, 1940,
Serial No. 366,010

4 Claims. (Cl. 106—93)

This invention relates to the production of oil from wells, and has among its objects and advantages the provision of a novel sealing composition for excluding water from oil and gas wells but otherwise maintaining the well productive.

Heretofore considerable difficulty has been experienced in the production of oil from wells because of the flow of water into the well. Many methods have been devised in an attempt to shut off the flow of water. In cementing a well, it frequently happens that oil bearing areas are cut off, since it is not always easy to determine the relative locations of the water and oil producing areas. In many cases the water and oil producing areas are closely spaced, which makes it additionally difficult to plug or cement the water producing areas without impairing and in many cases putting out of commission the oil producing areas.

An object of the present invention is to provide a composition which may be applied in the form of a mortar, wherein the composition embodies novel properties for cutting off the flow of water but leaving the oil producing areas unimpaired, notwithstanding the fact that the composition may be forced into the oil producing area or upon the surfaces of such areas.

Another object is to provide a composition of the type described which may be mixed with water to provide a mortar adapted to be forced into or otherwise applied to an oil well, with the mortar having properties causing it to set and effectively seal the water areas, but incapable of setting in and about the oil bearing sands to the end that such areas may continue to produce oil.

In the embodiment selected to illustrate the invention, the composition comprises four basic ingredients which are proportioned by volume as follows:

| | Per cent |
|---|---|
| Oil well cement | 70 |
| Unslacked lime | 15 |
| Beidellite | 10 |
| Iron oxide | 5 |

The oil well cement employed may be the old and well known type used in the art for cementing oil wells. In the present instance, the oil well cement is employed as a setting agent operating to lend the necessary strength to the composition when it sets in and about the water producing areas. The lime supplies a sufficient amount of lime to resist the action of sulphuric waters or other waters which may be encountered which would neutralize the lime content in the oil well cement. Weight is added to the composition by reason of the iron oxide, which ingredient also constitutes an oxidizing agent.

The beidellite ($Al_2O_3.3SiO_2.xH_2O$, in which $x$ is frequently equal to 4 and the alumina is replaceable by other oxides) constitutes mud such as employed for thickening the rotary mud in the drilling art, and constitutes a congealing agent to hold the composition together when loose sands and fractured shale areas are being sealed.

All the ingredients are mixed dry by the manufacturer and the user merely adds a sufficient quantity of water, preferably at a temperature of 60° to 75° F., to form a thin mortar. In treating a well which has a low head of water, the mortar may be placed in the well through the medium of a bottom dump bailer. When a sufficient quantity of the mortar has been placed into the well to fill the casing to the required number of feet, water is poured into the well to add sufficient weight to force the mortar through the slotted pipe out into the water sands. While the mortar may enter both the water and oil sands, the action of the oil and gas in the oil producing sand on the mortar is such as to prevent setting thereof in and about such areas, but the mortar will set hard in and about the water producing sands. Oil and gas in their respective oil producing sands act on the lime content to prevent setting of the mortar in these areas. After the mortar has set in and about the water producing sands, the mortar applied to the oil producing sands may be circulated or pumped from those sands and thereby allow the well to flow and the oil pumped free from water. Accordingly, in cases where the mortar is unavoidably applied to oil producing sands, the water producing sands are effectively sealed but no damage is done to the oil producing sands.

In cases where the well has a high head of water, paper pulp is added to the formula and the ingredients are then mixed with water to form a thin mortar, as outlined in connection with wells having low heads. The mortar is pumped into the well through the drill pipe or tubing with a "cement wagon" or a hydraulic pump. After a sufficient quantity of the mortar has been pumped into the well to fill the slotted casing the distance required to shut off the water, the drill pipe or tubing is pulled up in the casing far enough to clear the mortar. The casing is then filled with water and pressure is applied on the water with the "cement wagon" or hydraulic pump. Such pressure forces the mortar out into the water sands, after which it is allowed to set.

After setting of the sealing composition, any material remaining in the casing in the form of a plug is drilled out. Thus the water sands will be sealed and the oil will flow to be pumped from the well free from water.

Oil well formations differ considerably in different localities. In some communities, the sands are hard and of close formation, while in other communities the earth formation is characterized by loose fine sands and checked and porous shale. For such reasons, it is frequently necessary to modify the composition made up of the four enumerated basic ingredients to satisfy local conditions. In working loose sand and porous formations, calcium chloride may be added to speed up setting of the mortar. The calcium chloride may be added in the amount of 1% by volume to the aggregated four basic ingredients. The paper pulp, referred to in connection with wells having a high head, constitutes a fast clogging agent and may be added in the proportion of 3% by volume to the aggregated four basic ingredients. In cases where hard sands and tight formations are encountered, a thinning agent such as tannic acid may be added to the composition, which acid is preferably added in the amount of .5% to 1% by volume to the basic ingredients. Obviously, the amount of paper pulp, calcium chloride and tannic acid will vary according to local conditions as well as water pressure encountered in the well.

Having thus described certain embodiments of our invention in detail, it is, of course, understood that we do not desire to limit the scope thereof to the exact details set forth except insofar as those details may be defined in the appended claims.

We claim:

1. A water sealing composition for oil wells comprising oil well cement 70% by volume, unslacked lime 15% by volume, beidellite 10% by volume, and iron oxide 5% by volume.

2. A water sealing composition for oil wells comprising a first batch made up of oil well cement 70% by volume, unslacked lime 15% by volume, beidellite 10% by volume, iron oxide 5% by volume; and calcium chloride in the amount of 1% by volume to the aggregated ingredients of said first batch.

3. A water sealing composition for oil wells comprising a first batch made up of oil well cement 70% by volume, unslacked lime 15% by volume, beidellite 10% by volume, iron oxide 5% by volume; and paper pulp in the proportion of 3% by volume to the aggregated ingredients of said first batch.

4. A water sealing composition for oil wells comprising a first batch made up of oil well cement 70% by volume, unslacked lime 15% by volume, beidellite 10% by volume, iron oxide 5% by volume; and tannic acid in the amounts varying from .5% to 1% by volume to the ingredients of said first batch.

DAVID L. MITCHELL.
HARRY MARKS.
HARRY C. BEENE.